United States Patent
Froemel et al.

(10) Patent No.: US 9,945,884 B2
(45) Date of Patent: Apr. 17, 2018

(54) SYSTEM AND METHOD FOR A WIND SPEED METER

(71) Applicant: Infineon Technologies AG, Neubiberg (DE)

(72) Inventors: Andreas Froemel, Kirchseeon (DE); Waldemar Marsetz, Munich (DE)

(73) Assignee: Infineon Technologies AG, Neubiberg (DE)

(*) Notice: Subject to any disclaimer, the term of this patent is extended or adjusted under 35 U.S.C. 154(b) by 282 days.

(21) Appl. No.: 14/610,933

(22) Filed: Jan. 30, 2015

(65) Prior Publication Data
US 2016/0223579 A1 Aug. 4, 2016

(51) Int. Cl.
| G01F 13/00 | (2006.01) |
| G01P 5/00 | (2006.01) |
| G01P 5/14 | (2006.01) |
| G01L 9/06 | (2006.01) |
| G01L 9/08 | (2006.01) |
| G01P 13/04 | (2006.01) |

(52) U.S. Cl.
CPC ............... *G01P 5/14* (2013.01); *G01L 9/06* (2013.01); *G01L 9/08* (2013.01); *G01P 13/045* (2013.01)

(58) Field of Classification Search
None
See application file for complete search history.

(56) References Cited

U.S. PATENT DOCUMENTS

| 4,131,088 A * | 12/1978 | Reddy ................ G01L 9/06 123/494 |
| 4,829,813 A * | 5/1989 | Syed ................ G01P 5/175 73/112.01 |
| 6,691,579 B2 * | 2/2004 | Orr ................ G01L 13/00 73/700 |
| 9,322,685 B2 * | 4/2016 | Ray ................ G01P 5/14 |
| 2008/0218934 A1 | 9/2008 | Langereis et al. |
| 2012/0020485 A1 | 1/2012 | Visser et al. |
| 2014/0226838 A1 | 8/2014 | Wingate et al. |
| 2015/0276529 A1 | 10/2015 | Wiesbauer et al. |
| 2016/0223579 A1 | 8/2016 | Froemel et al. |

FOREIGN PATENT DOCUMENTS

| JP | 2009507656 A | 2/2009 |
| JP | 2011195282 A | 10/2011 |

OTHER PUBLICATIONS

Ma, et al., "A MEMS-Based Flow Rate and Flow Direction Sensing Platform with Integrated Temperature Compensation Scheme," Sensors 2009, revised Jun. 26, 2009, 17 pages.

* cited by examiner

*Primary Examiner* — Peter Macchiarolo
*Assistant Examiner* — Jermaine Jenkins
(74) *Attorney, Agent, or Firm* — Slater Matsil, LLP

(57) ABSTRACT

According to an embodiment, a method of measuring wind speed includes measuring atmospheric pressure at a first pressure sensor arranged inside a case and shielded from wind, measuring air pressure at a second pressure sensor arranged at an opening in the case, and determining wind speed at the opening in the case based on measuring the atmospheric pressure and the air pressure.

27 Claims, 15 Drawing Sheets

SYSTEM AND METHOD FOR A WIND SPEED METER

TECHNICAL FIELD

The present invention relates generally to electronic devices, and, in particular embodiments, to a system and method for a wind speed meter.

BACKGROUND

Transducers that convert signals from one domain to another are often used in sensors. A common sensor that includes a transducer is a pressure sensor that converts pressure differences and/or pressure changes to electrical signals. Pressure sensors have numerous applications including, for example, atmospheric pressure sensing, altitude sensing, and weather monitoring.

Microelectromechanical system (MEMS) based sensors include a family of transducers produced using micromachining techniques. MEMS, such as a MEMS pressure sensor, gather information from the environment by measuring the change of physical state in the transducer and transferring the signal to be processed by the electronics, which are connected to the MEMS sensor. MEMS devices may be manufactured using micromachining fabrication techniques similar to those used for integrated circuits.

MEMS devices may be designed to function as oscillators, resonators, accelerometers, gyroscopes, pressure sensors, microphones, and/or micro-mirrors, for example. Many MEMS devices use capacitive sensing techniques for transducing the physical phenomenon into electrical signals. In such applications, the capacitance change in the sensor is converted to a voltage signal using interface circuits.

Pressure sensors may also be implemented as capacitive MEMS devices that include a sealed volume and a deflectable membrane. A pressure difference between the sealed volume and an external volume, such as the ambient environment in some cases, causes the membrane to deflect. Generally, the deflection of the membrane causes a change in distance between the membrane and a sensing electrode, thereby changing the capacitance.

SUMMARY

According to an embodiment, a method of measuring wind speed includes measuring atmospheric pressure at a first pressure sensor arranged inside a case and shielded from wind, measuring air pressure at a second pressure sensor arranged at an opening in the case, and determining wind speed at the opening in the case based on measuring the atmospheric pressure and the air pressure.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely pressure transducers, and more particularly, MEMS pressure transducers. Some of the various embodiments described herein include MEMS transducer systems, MEMS pressure transducers, sensor packages including MEMS pressure transducers, electronic devices including sensor packages, and sensor package configurations for measuring wind speed. In other embodiments, aspects may also be applied to other applications involving any type of transducer or electronic device according to any fashion as known in the art.

According to various embodiments described herein, a wind speed meter is implemented using MEMS pressure sensors. Generally, wind speed meters are implemented using pitot tubes or wind turbines. Such devices may be expensive or bulky in certain circumstances. Thus, various embodiments include wind speed meters implemented using small MEMS pressure sensors. In such embodiments, a first MEMS pressure sensor is arranged inside an electronic device and a second MEMS pressure sensor is arranged at an air or pressure port in the electronic device. The first MEMS pressure sensor is shielded from the wind and is used to measure the atmospheric pressure while the second MEMS pressure sensor is exposed to the wind through the port in the electronic device and is used to measure the air pressure from the wind. Using these two pressure measurements, the pressure caused by the wind is determined and the wind speed causing the pressure may be calculated in various embodiments. In such embodiments, the first MEMS pressure sensor may be referred to as being in indirect fluid communication with the port in the electronic device while the second MEMS pressure sensor may be referred to as being in direct fluid communication with the port of the electronic device. In various embodiments, additional MEMS pressure sensors may be included in order to determine wind direction in addition to wind speed. Various specific embodiments are described herein below.

Figure 1:
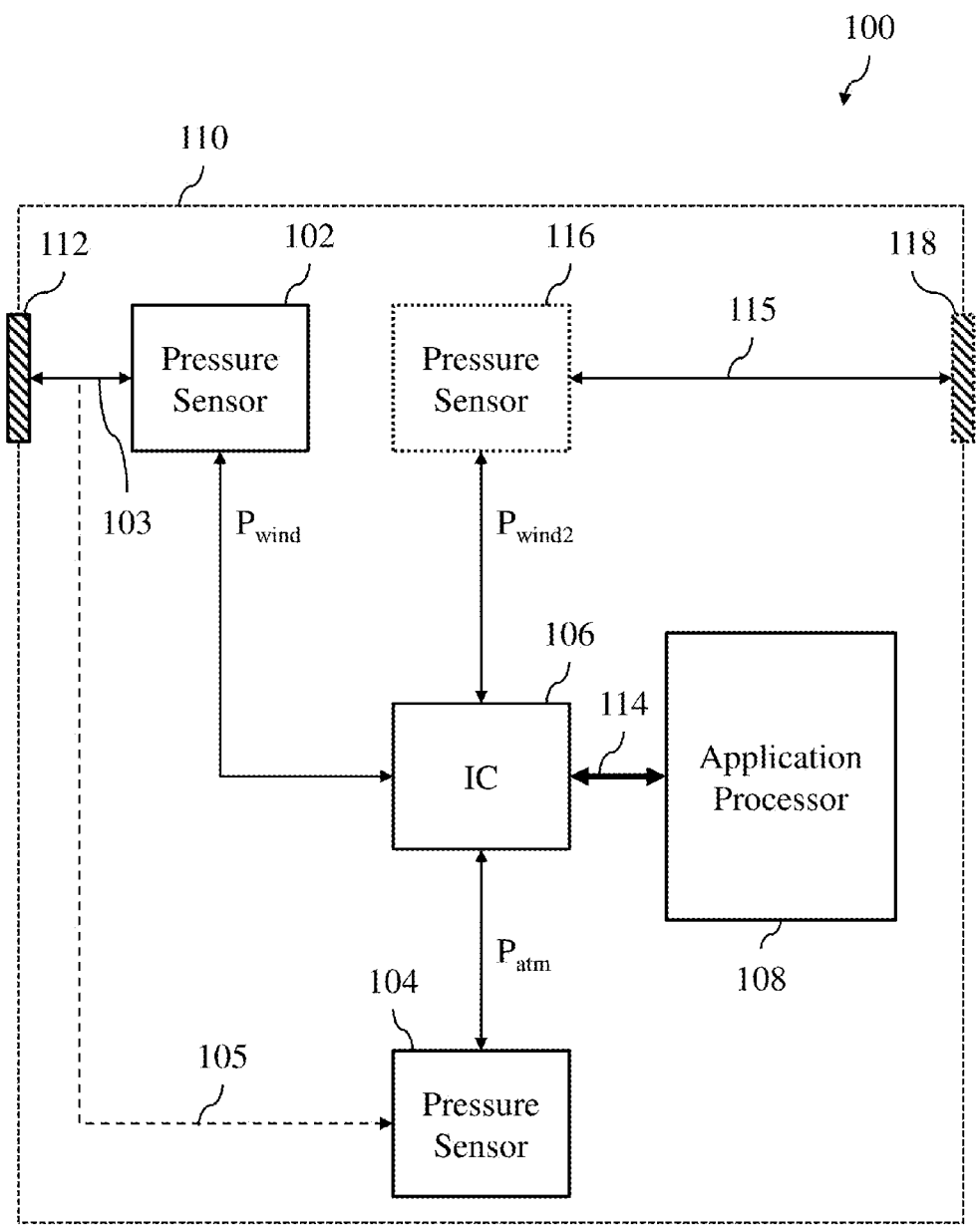
FIG. 1 illustrates a system block diagram of an embodiment sensing device.

FIG. 1 illustrates a system block diagram of an embodiment sensing device 100 including pressure sensor 102, pressure sensor 104, integrated circuit (IC) 106, and application processor 108 inside case 110, which includes port 112. According to various embodiments, sensing device 100 may be any type of electronic device that includes a wind speed meter implemented by pressure sensor 102 and pressure sensor 104. Pressure sensor 102 may be exposed to wind that is outside case 110 through port 112. In such embodiments, pressure sensor 102 is in direct fluid communication with port 112, as illustrated by the solid line of direct coupling 103. Pressure sensor 104 may be shielded from wind by being arranged within case 110. In such embodiments, pressure sensor 104 is in indirect fluid communication with port 112, as illustrated by the broken line of indirect coupling 105. In various embodiments, pressure sensor 104 measures the atmospheric pressure while being shielded from wind and pressure sensor 102 measures the air pressure at port 112 caused by wind while not being shielded from the wind. Case 110 may be the device package or structure. For example, case 110 is the outer case for a mobile phone in one embodiment.

In various embodiments, IC 106 receives wind pressure signal Pwind from pressure sensor 102 and atmospheric pressure signal Patm from pressure sensor 104. Wind pressure signal Pwind and atmospheric pressure signal Patm may be transduced electrical signals generated by MEMS pressure transducers in pressure sensors 102 and 104, respectively. IC 106 receives wind pressure signal Pwind and atmospheric pressure signal Patm, amplifies the signals, and provides amplified signals to application processor 108 through I/O bus 114. Based on the received amplified signals from IC 106 through I/O bus 114, application processor 108 determines the wind speed at port 112. In other embodiments, pressure sensor 102 and pressure sensor 104 may be coupled to separate ICs that are coupled to application processor 108. In such embodiments, IC 106 is split into two ICs (not shown).

In various embodiments, IC 106 may include various circuits for various embodiments. One example embodiment is described herein below in reference to FIG. 14. Further, application processor 108 may be implemented as a general processor or a specific application processor in sensing device 100. For example, application processor 108 may be implemented as a sensor specific processing unit, a general purpose central processing unit (CPU), a microprocessor, a digital signal processor (DSP), or a field programmable gate array (FPGA) in various embodiments. In various embodiments, sensing device 100 may be any type of electronic device such as an outdoor electronic device, a speedometer such as, e.g., for a bicycle, a mobile phone, a tablet computer, or a smart watch, for example.

In some embodiments, sensing device 100 may include additional pressure sensor 116 and additional port 118. In such embodiments, pressure sensor 116 is in direct fluid communication with port 118, as illustrated by the solid line of direct coupling 115. Pressure sensor 116 provides additional wind pressure signal Pwind2 to IC 106, which also supplies a corresponding amplified signal to application processor 108 through I/O bus 114. Based on the additional wind pressure signal Pwind2, application processor 108 may also determine the wind direction. In further embodiments, any number of additional pressure sensors and ports may be included in sensing device 100 in order to improve the accuracy of wind speed and direction, i.e., velocity, measurements. In some embodiments, pressure sensor 116 is coupled to a separate IC that is coupled to application processor 108. In such embodiments, IC 106 is split into two or more separate ICs (not shown).

In various embodiments, port 112, as well as additional ports such as port 118, have openings less than or equal to 0.5 mm across. In particular embodiments, port 112 and any additional ports have openings less than or equal to 0.3 mm across. Specifically port 112 and any additional ports may have a rectangular shaped opening, a circular shaped opening, or an irregular shaped opening with a long dimension less than or equal to 0.3 mm. In other embodiments, larger openings or any shape of opening may be included.

Figure 2A:
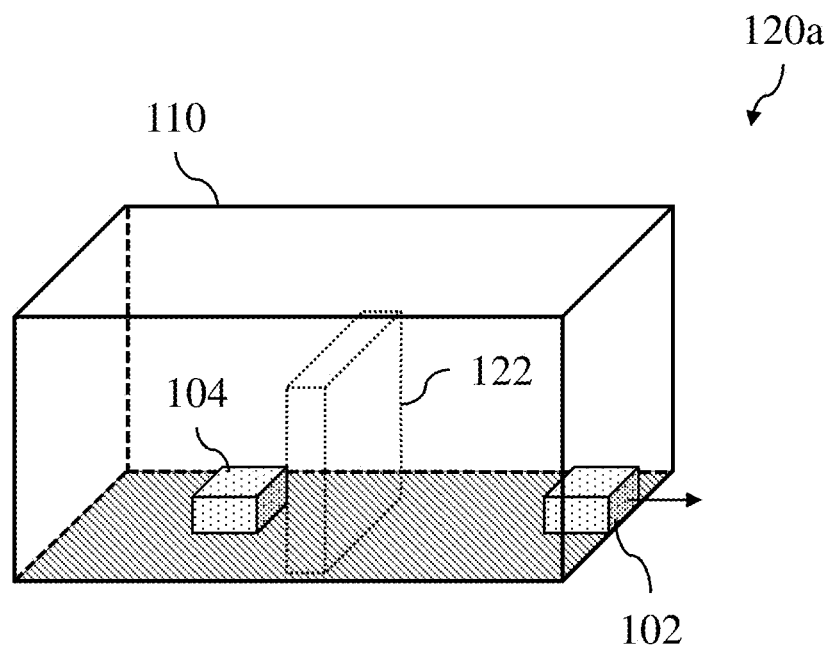
FIGS. 2a and 2b illustrate schematic diagrams of embodiment sensing devices.
Figure 2B:
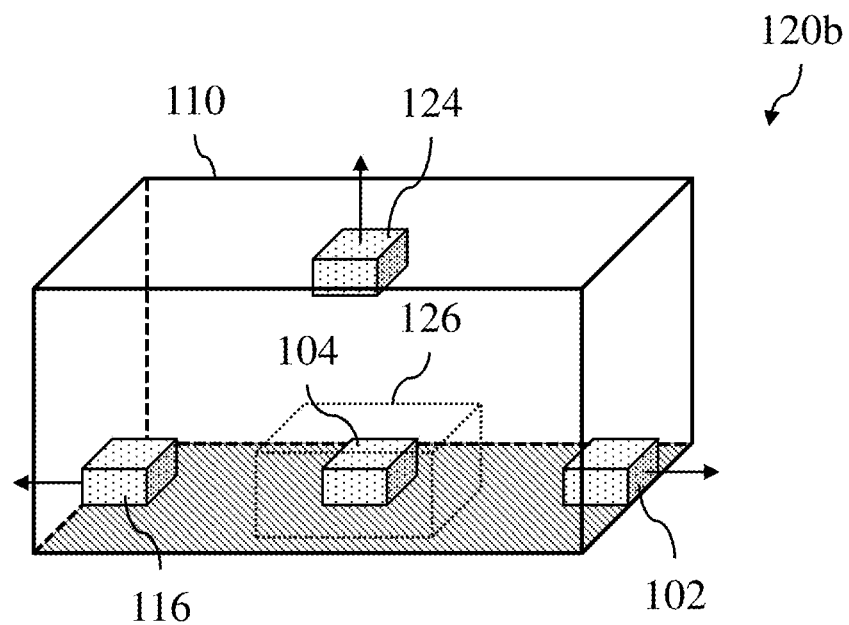

FIGS. 2a and 2b illustrate schematic diagrams of embodiment sensing devices 120a and 120b, which may be implementations of sensing device 100. According to various embodiments, sensing device 120a includes pressure sensor 102 and pressure sensor 104 inside case 110. As described hereinabove, pressure sensor 104 is an atmospheric pressure sensor implemented as a MEMS pressure transducer and shielded from wind outside case 110. Further, pressure sensor 102 is an air pressure sensor implemented as a MEMS pressure transducer and is not shielded from, i.e., is exposed to, wind outside case 110, and specifically at a port in case 110. In order to implement wind shielding, pressure sensor 104 may be placed further away from a port in case 110 and may include obstruction 122 between the port and pressure sensor 104 such that pressure sensor 104 is in indirect fluid communication with a port or ports in case 110. In various embodiments, obstruction 122 may include other device components such as a battery, processor, display, or package material, for example. In further embodiments, obstruction 122 may include a specific wind shield, such as a foam barrier, cloth barrier, porous structure, or structural package wall. For simplicity of illustration, other elements inside case 110 are not illustrated. Additional elements, such as described herein below in reference to FIG. 4, may be included inside case 110.

According to various embodiments, sensing device 120b includes pressure sensor 102 and pressure sensor 104 inside case 110, along with pressure sensor 116 and pressure sensor 124. As described hereinabove in reference to FIG. 1, additional pressure sensors may be included in order to also determine wind direction, thereby making wind velocity measurements possible. Thus, in such embodiments, pressure sensor 116 may be exposed to wind outside case 110 at an additional port in case 110 and pressure sensor 124 may be exposed to wind outside case 110 at still another port in case 110.

According to one embodiment, pressure sensor 104 is omitted and pressure sensor 102 and pressure sensor 116 are used to determine wind speed. In such embodiments, pressure sensor 102 may be faced into the wind and pressure sensor 116 may be faced away from the wind. As similarly described hereinabove in reference to FIG. 1, application processor 108 determines the wind speed using a difference in pressure signals from pressure sensor 102 and pressure sensor 116. The wind speed is determined at a port in case 110, such as port 112 in FIG. 1, adjacent to pressure sensor 102 that is faced into the wind.

Pressure sensors 102, 116, and 124 may be arranged on any side of case 110. In some embodiments, pressure sensors 102, 116, and 124 are arranged at 90° orientations to one another. In various embodiments, any number of pressure sensors may be included. For example, a pressure sensor may be included on each of the six faces, or sides, of case 110. In an alternative embodiment, case 110 may have a different number of faces, or sides, and may include a corresponding number of pressure sensors. In a specific embodiment, pressure sensors 102, 104, 116, and 124 are included. In another embodiment, only pressure sensors 102, 104, and one of 116 or 124 are included for a total of three pressure sensors. In various embodiments, case 110 may have a shape suited to the particular application. Ports in case 110 may be arranged according to the shape of case 110. Various positions and orientations of ports and pressure sensors are envisioned in various embodiments.

In various embodiments, sensing device 120b also includes a wind shield or wind shields for pressure sensor 104. In such embodiments, the wind shield may surround pressure sensor 104 as illustrated by obstruction 126. Obstruction 126 may include any of the elements described in reference to obstruction 122 and may be arranged around or over pressure sensor 104 such that pressure sensor 104 is in indirect fluid communication with ports in case 110.

In various embodiments, any of the pressure sensors described herein, such as pressure sensors 102, 104, 116, or 124, may have a cubic volume less than or equal to about 50 mm$^3$. In some embodiments, each pressure sensor has aa surface dimension less than or equal to 5 mm by 5 mm and has a thickness less than or equal to 2 mm. In other embodiments, each pressure sensor may have a larger area and thickness. Each pressure sensor may comprise a packaged sensor device as described herein below in reference to FIGS. 4, 5a, 5b, and 6, for example.

Figure 3:
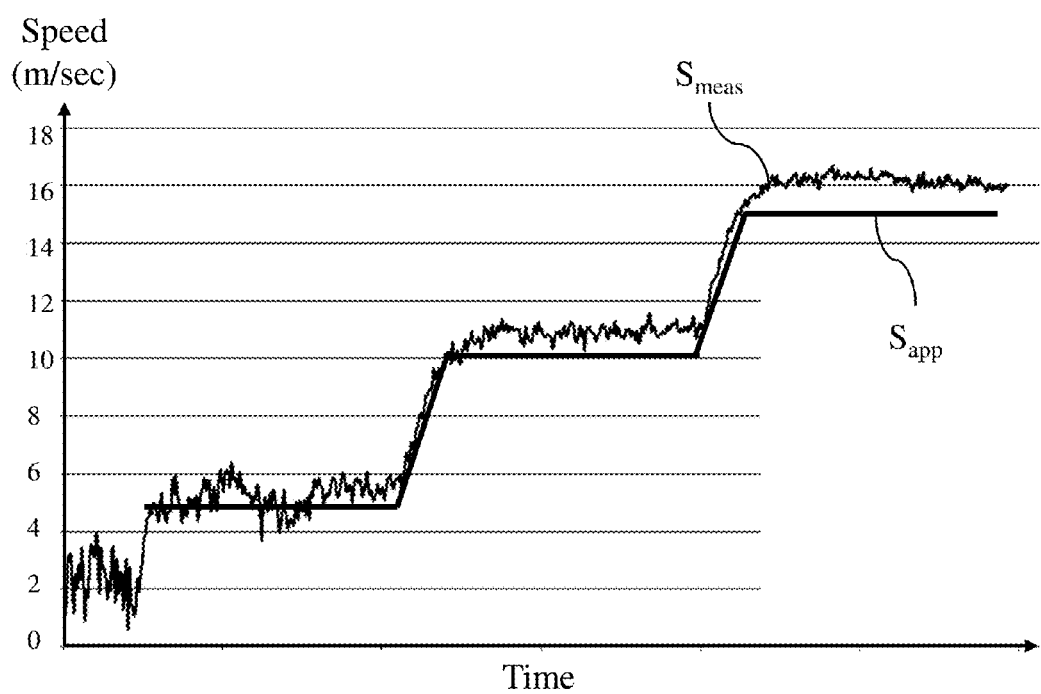
FIG. 3 illustrates a diagram of wind speed measurement for an embodiment sensing device in operation.

FIG. 3 illustrates a diagram of wind speed measurement for an embodiment sensing device in operation showing applied wind speed Sapp and measured wind speed Smeas. As shown, the measured wind speed Smeas includes a fast response time and high accuracy in some embodiments. As the wind applied to the embodiment sensing device changes, the corresponding measurement tracks the changes that are applied.

Figure 4:
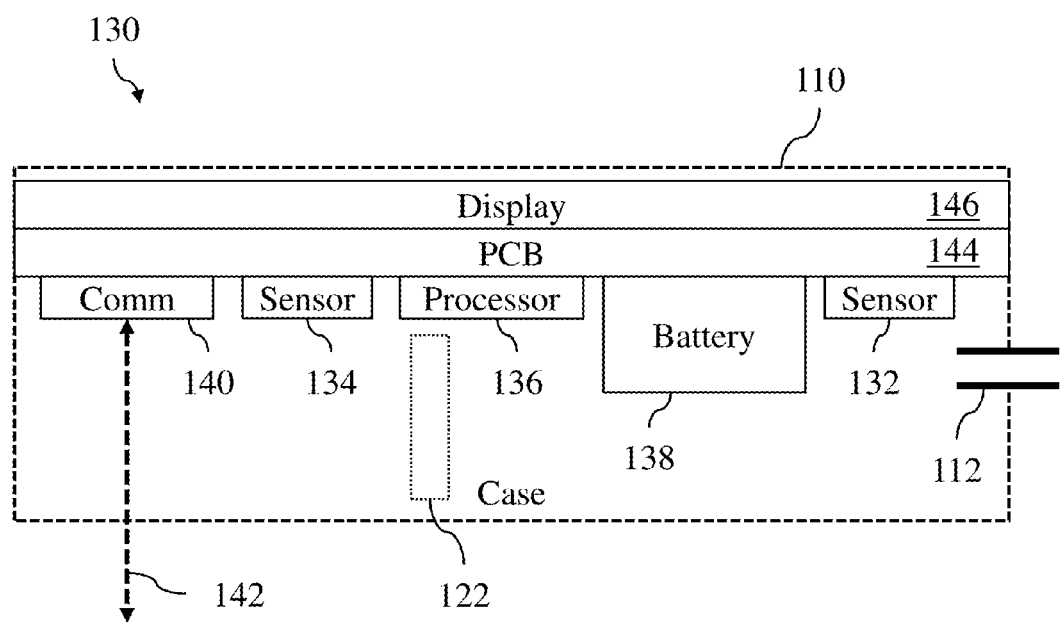
FIG. 4 illustrates a system block diagram of another embodiment sensing device.

FIG. 4 illustrates a system block diagram of another embodiment sensing device 130, which may be an implementation of sensing device 100. According to various embodiments, sensing device 130 includes sensor package 132, sensor package 134, processor 136, battery 138, communication circuit 140, and display 146 attached to printed circuit board (PCB) 144 inside case 110, which includes port 112. In various embodiments, sensing device 130 may be a mobile electronic device, such as a tablet computer, smart watch, speedometer, smart weather device, or a mobile phone. Sensor packages 132 and 134 function as similarly described hereinabove in reference to pressure sensors 102 and 104 in FIG. 1, but are each implemented as a packaged device that includes an interface IC. For example, sensor packages 132 and 134 each include a MEMS pressure transducer and an interface IC connected to a circuit board and contained in a senor package. Sensor package 132 is directly coupled to the ambient environment, including wind in the ambient environment, through port 112, while sensor package 132 is indirectly coupled to the ambient environment and may be shielded by obstruction 122 or the other components in sensing device 130.

In various embodiments, sensor packages 132 and 134 are coupled to PCB 144 and contained inside case 110. For example, case 110 may be the body of a tablet computer or a mobile phone. Display 146 may also be coupled to PCB 144. In some embodiments, processor 136 and communication circuit 140 are coupled to PCB 144. Communication circuit 140 communicates through communication pathway 142, which is a wireless communication pathway. For example, communication circuit 140 may include a Bluetooth transceiver, a WiFi transceiver, or a cellular network transceiver. In an alternative embodiment, communication pathway 142 is a wired connection.

In various embodiments, sensor package 132 generates electrical signals representing air pressure from wind at port 112 and provides the generated electrical signals through PCB 144 to processor 136. Sensor package 134 generates electrical signals representing the atmospheric pressure inside case 110 and provides the generated electrical signals through PCB 144 to processor 136. Processor 136 may operate as described hereinabove in reference to application processor 108 in FIG. 1 in order to determine the wind speed at port 112. In alternative embodiments, sensing device 130 is a wired device, such as a workstation, personal computer, or a computing system for a specific application, such as weather analysis, industrial, recreational, or aerospace applications, for example, and communication pathway 142 may be a wired or wireless communication pathway.

In various embodiments, sensor packages 132 and 134 may have cubic volumes less than or equal to about 50 mm$^3$. For example, in some embodiments, sensor packages 132 and 134 have surface dimensions less than or equal to 5 mm by 5 mm and have thicknesses less than or equal to 2 mm. In other embodiments, each of sensor packages 132 and 134 may have a larger area or thickness.

Figure 5A:
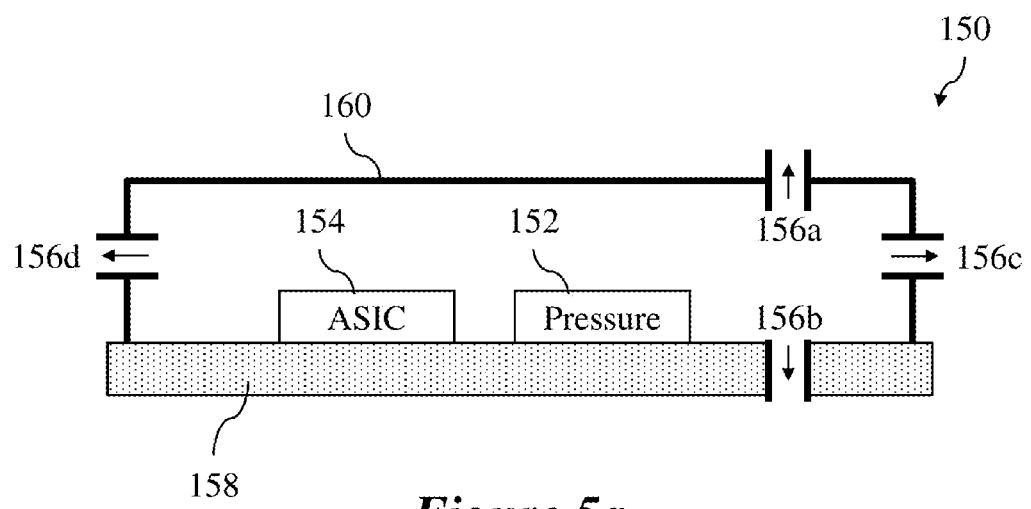
FIGS. 5a and 5b illustrate a cross-section and a top view of an embodiment sensor package.
Figure 5B:
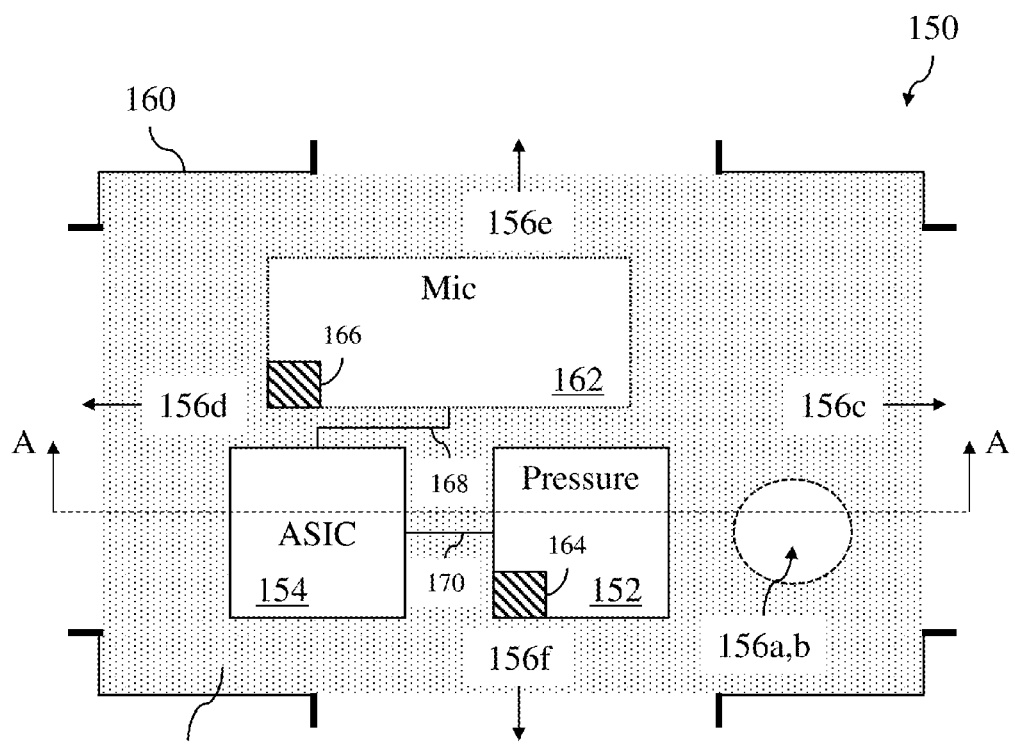

FIGS. 5a and 5b illustrate a cross-section and a top view of an embodiment sensor package 150, which may be an implementation of sensor package 132 or sensor package 134 described hereinabove in reference to FIG. 4. Specifically, FIG. 5a illustrates cross-section A as illustrated by the top view in FIG. 5b. According to various embodiments, sensor package 150 includes MEMS pressure transducer 152 and application specific integrated circuit (ASIC) 154 attached to circuit board 158 inside package cover 160, which includes any of ports 156a-156f. In such embodiments, MEMS pressure transducer 152 measures the air pressure of the ambient environment surrounding sensor package 150 and provides transduced electrical signals based on the measured air pressure to ASIC 154 through connections in circuit board 158.

In various embodiments, MEMS pressure sensor is fluidically coupled to the ambient environment of sensor package 150 through one or more of ports 156a, 156b, 156c, 156d, 156e, and 156f. Ports 156a and 156b may be ventilation ports in package cover 160, i.e., a top opening, or circuit board 158, i.e., a bottom opening, respectively. Further, the sides of package cover 160 may include any of ports 156c, 156d, 156e, and 156f. Ports 156c, 156d, 156e, and 156f may be formed as openings of ventilation structures in package cover 160 or may be formed in a separate structure between package cover 160 and circuit board 158, such as in a bonding material attaching package cover 160 to circuit board 158.

In various embodiments, ports 156a, 156b, 156c, 156d, 156e, and 156f may be referred to as environmental or fluidic ports that allow the transfer of fluidic signals. Fluidic signals include transport of liquids and gases as well as signals propagating through such fluidic mediums such as, specifically, air pressure signals. Acoustic signals may also be transferred. FIG. 5b illustrates an edge of package cover 160 in contact with circuit board 158, but otherwise is illustrated as a see-through structure in order to show elements of sensor packaged 150, which would otherwise be hidden from view by package cover 160.

In various embodiments, setting the size and number of ports 156a, 156b, 156c, 156d, 156e, and 156f may adjust the frequency response of the cavity inside package cover 160. For example, larger openings and a greater number of openings increases the high frequency limit of signals that may be sensed. Conversely, smaller openings or a lesser number of openings decreases the high frequency limit of signals that may be sensed. Thus, the configuration of ports 156a, 156b, 156c, 156d, 156e, and 156f may act as a low pass filter (LPF) for fluidic signals, such as pressure changes or acoustic signals.

In various embodiments, sensor package 150 optionally includes MEMS microphone 162 attached to circuit board 158 in addition to MEMS pressure transducer 152 and ASIC 154. MEMS pressure transducer 152 is electrically coupled to ASIC 154 through coupling 170 and optional MEMS microphone 162 is electrically coupled to ASIC 154 through coupling 168. Couplings 168 and 170 may be provided as conductive lines on or within circuit board 158. In other embodiments, MEMS pressure transducer 152 may be integrated with ASIC 154 on a single microfabricated die attached to circuit board 158. In a further embodiment, MEMS pressure transducer 152 may be stacked on ASIC 154 and electrically coupled to ASIC 154. For example, MEMS pressure transducer 152 may be coupled to ASIC 154 through flip-chip bonding or wire bonding.

In various embodiments, MEMS pressure transducer 152 or optional MEMS microphone 162 further include integrated temperature sensors 164 and 166, respectively. In such embodiments, MEMS pressure transducer 152 includes integrated temperature sensor 164 formed together on a single microfabricated die. Integrated temperature sensor 164 may be formed separately on a same substrate as MEMS pressure transducer 152 or may be formed in the sensing structure of the MEMS pressure transducer.

In specific embodiments, circuit board 158 may be formed of various circuit board materials including but not limited to laminates, copper-clad laminates, resin impregnated cloth, and copper foil. Package cover 160 may be a metal cover. In some specific embodiments, package cover 160 is copper, steel, or aluminum. In alternative embodiments, package cover 160 is formed of a polymer or glass.

Figure 6:
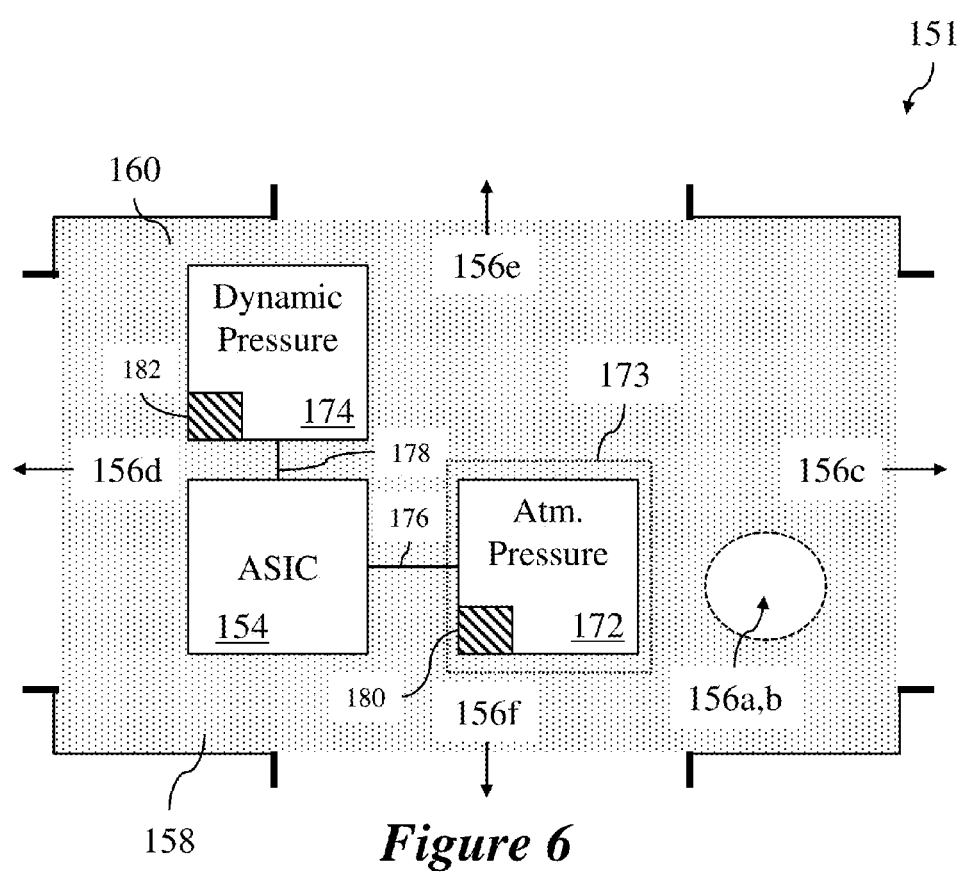
FIG. 6 illustrates a top view of another embodiment sensor package.

FIG. 6 illustrates a top view of another embodiment sensor package 151 that includes atmospheric MEMS pressure transducer 172, dynamic MEMS pressure transducer 174, and ASIC 154 attached to circuit board 158 inside package cover 160. According to various embodiments, sensor package 151 operates in a similar manner as sensor package 150, but instead includes two pressure transducers, atmospheric MEMS pressure transducer 172 and dynamic MEMS pressure transducer 174. Atmospheric MEMS pressure transducer 172 measures the atmospheric pressure and filters local pressures changes whereas dynamic MEMS pressure transducer 174 measures the local pressure changes. In various embodiments, the filtering for atmospheric MEMS pressure transducer 172 may be implemented as an LPF circuit, such as in ASIC 154 for example, or may be implemented as wind shield 173 that surrounds atmospheric MEMS pressure transducer 172. In particular embodiments, atmospheric MEMS pressure transducer 172 is surrounded by foam, cloth, mesh, or a porous structure as wind shield 173. In such embodiments, wind shield 173 may be included as a portion of the microfabricated die of atmospheric MEMS pressure transducer 172 or may be attached around atmospheric MEMS pressure transducer 172 on circuit board 158.

In various embodiments, dynamic MEMS pressure transducer 174 measures local changes in air pressure, such as caused by wind for example, without filtering such signals. In some embodiments, dynamic MEMS pressure transducer 174 may be implemented with an identical sensing structure as atmospheric MEMS pressure transducer 172, but without the wind shield. In further embodiments, ASIC 154 may include different LPF circuits for atmospheric MEMS pressure transducer 172 and dynamic MEMS pressure transducer 174 with different cutoff frequencies. For example, dynamic MEMS pressure transducer 174 may be coupled to a filter that passes frequencies up to 10 Hz or 100 Hz while atmospheric MEMS pressure transducer 172 may be coupled to a filter that passes frequencies up to only 0.5 Hz or 1 Hz. In particular embodiments, dynamic MEMS pressure transducer may be implemented as described in co-pending patent application Ser. No. 14/231,068 entitled "Dynamic Pressure Sensor" and filed Mar. 31, 2014, which is incorporated herein by reference in its entirety.

In various embodiments, ASIC 154 is electrically coupled to atmospheric MEMS pressure transducer 172 through coupling 176 and is electrically coupled to dynamic MEMS pressure transducer 174 through coupling 178. Couplings 176 and 178 may be provided as conductive lines on or within circuit board 158. In some embodiments, atmospheric MEMS pressure transducer 172 and dynamic MEMS pressure transducer 174 may include integrated temperature sensors 180 or 182, respectively, as described hereinabove in reference to integrated temperature sensor 164 in FIG. 5b.

In various embodiments, sensor package 151 may be an implementation of sensor package 132 as described hereinabove in reference to FIG. 4. In a particular embodiment, sensor package 134 may be omitted because sensor package 151 includes both atmospheric MEMS pressure transducer 172 and dynamic MEMS pressure transducer 174.

Figure 7:
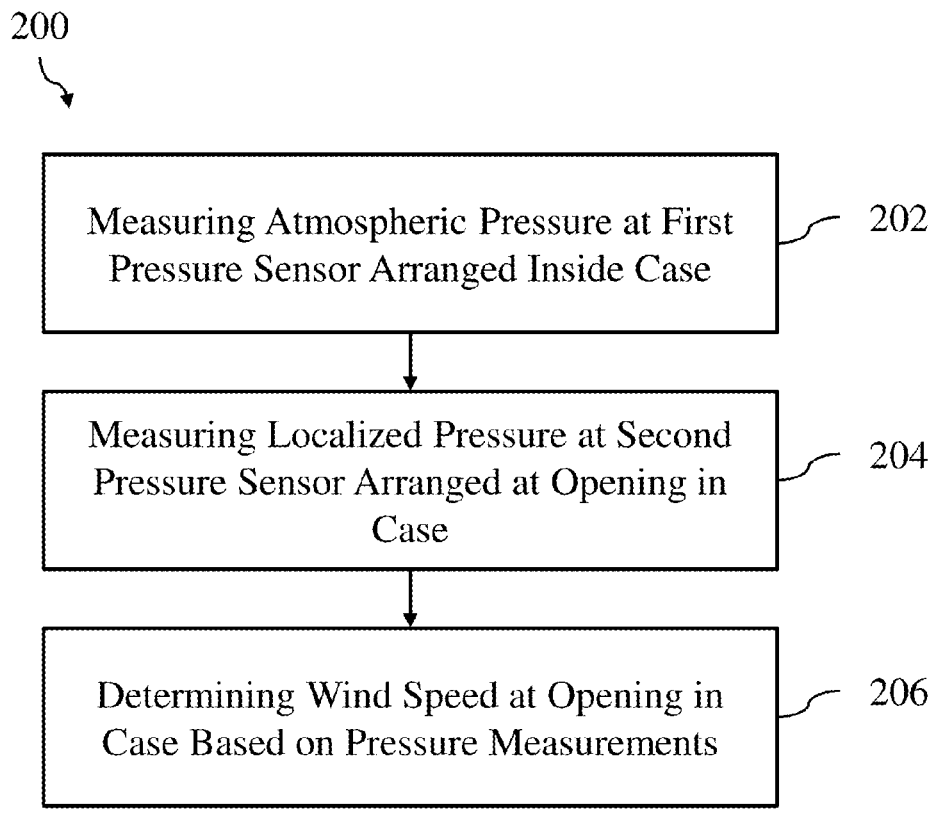
FIG. 7 illustrates a block diagram of an embodiment method of operation for a sensing device.

FIG. 7 illustrates a block diagram of an embodiment method of operation 200 for a sensing device. According to various embodiments, method of operation 200 includes steps 202, 204, and 206, and implements a method of measuring wind speed. In such embodiments, step 202 includes measuring atmospheric pressure at a first pressure sensor arranged inside a case and shielded from wind. Step 204 includes measuring air pressure at a second pressure sensor arranged at an opening in the case. Following steps 202 and 204, step 206 includes determining wind speed at the opening in the case based on measuring the atmospheric pressure in step 202 and measuring the air pressure at the opening in the case in step 204. As described herein, pressure measurements may be performed using MEMS pressure transducers in various embodiments. The sensing device that operates according to method of operation 190 may be any type of electronic device, such as an outdoor device for example, that includes pressure transducers. The pressure measurements in steps 202 and 204 may be transduced electrical signals generated at the MEMS pressure transducers and provided to a processing circuit, such as a microprocessor or DSP for example, which implements step 206.

Figure 8:
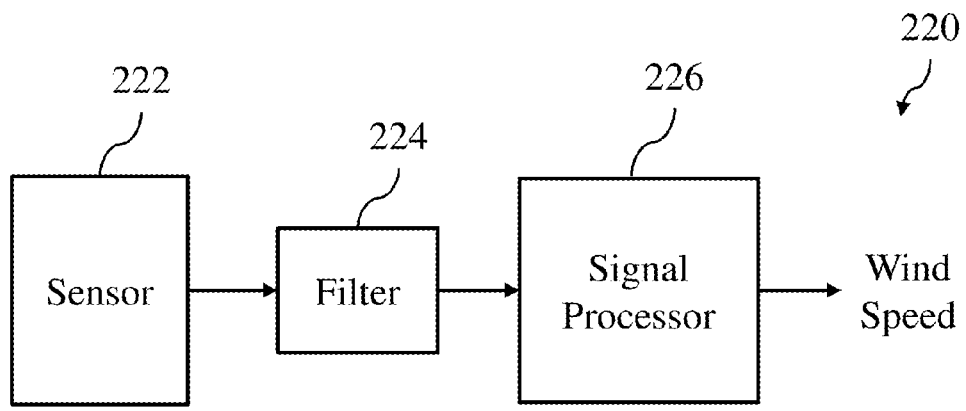
FIG. 8 illustrates a system block diagram of an embodiment processing system.

FIG. 8 illustrates a system block diagram of an embodiment processing system 220 that includes pressure sensors 222, filter 224, and signal processor 226. According to various embodiments, pressure sensors 222 include two or more MEMS pressure transducers as described herein in reference to the other figures. Pressure sensors 222 measure atmospheric pressure and air pressure at a specific point, such as a port in a device case. In another embodiment, pressure sensors 222 may measure air pressure at two ports in a device case, where the two ports are facing opposite directions, for example. The pressure measurement signals are provided through filter 224, which may remove higher frequency signals, such as acoustic signals or other signal noise. Signal processor 226 receives the filtered pressure measurement signals and determines wind speed based on the pressure measurements.

According to an embodiment, signal processor 226 may calculate wind speed based on the square root of the difference between two air pressure measurements. In a specific example, pressure sensors 222 provide an atmospheric pressure signal Patm from inside the device case and an air pressure signal Pwind measured at the port in the device case. Signal processor 226 receives these signals and calculates the wind speed S using the equation, S=$\sqrt{2 \cdot (Pwind - Patm) \div \rho}$, where $\rho$ is the density of air.

Figure 9:
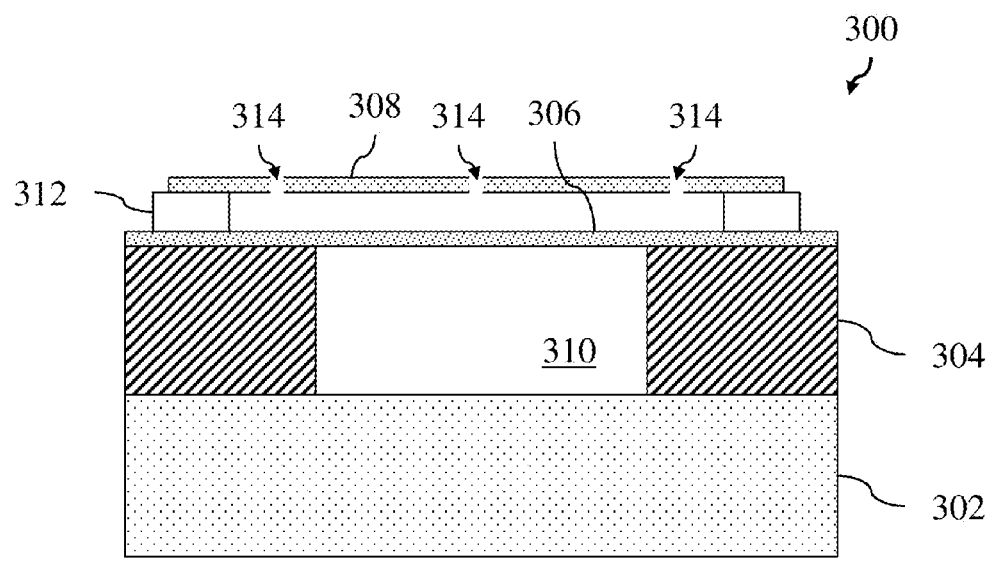
FIG. 9 illustrates a cross-section of a MEMS pressure transducer.

FIG. 9 illustrates a cross-section of MEMS pressure transducer 300 that includes substrate 302, sidewalls 304, deflectable membrane 306, rigid backplate 308, and cavity 310. Backplate 308 is separated from membrane 306 by spacers 312 includes perforations 314. According to various embodiments, MEMS pressure transducer 300 is fabricated in a manner similar to a MEMS microphone, as is described herein below in reference to FIGS. 13a-13r.

In some embodiments, a pressure change in the ambient environment produces a pressure difference between cavity 310 and the ambient environment that causes membrane 306 to deflect. The deflection of membrane 306 changes the distance between membrane 306 and backplate 308. The change in distance changes the effective capacitance between the two plates and produces a transduced electrical signal on a readout electrode (not shown). The transduced electrical signal corresponds to the change in pressure that occurred. According to some embodiments, MEMS pressure transducer 300 may be implemented as a MEMS microphone and low pass frequency (LPF) response may be implemented by digital or analog filters. In one particular embodiment, the MEMS pressure transducer 300 may be covered or insulated with an acoustically muffling material, such as foam for example, in order to reduce acoustic noise and improve pressure sensing.

In various embodiments, the size (planar area) and number of perforations 314 affects the high frequency cutoff $f_H$ of the frequency response for MEMS pressure transducer 300. In further embodiments, the mass of membrane 306 also affects the high frequency cutoff $f_H$. In still further embodiments, other factors may adjust the high and low frequency cutoffs $f_H$ and $f_L$. For example, the volume of the cavity, the size of the membrane (set by radius of cavity), the thickness of the membrane, and other features may affect the high and low frequency cutoffs $f_H$ and $f_L$.

According to various embodiments, backplate 308 has a thickness between 0.5 µm and 5 µm, perforations 314 have diameters between 0.5 µm and 10 µm, membrane 306 has a thickness between 0.1 µm and 1 µm, cavity 310 has a diameter between 0.2 mm and 2 mm and a thickness between 0.1 mm and 1 mm, and the separation distance between backplate 308 and membrane 306 as set by spacers 312 is between 0.5 µm and 5 µm.

Figure 10:
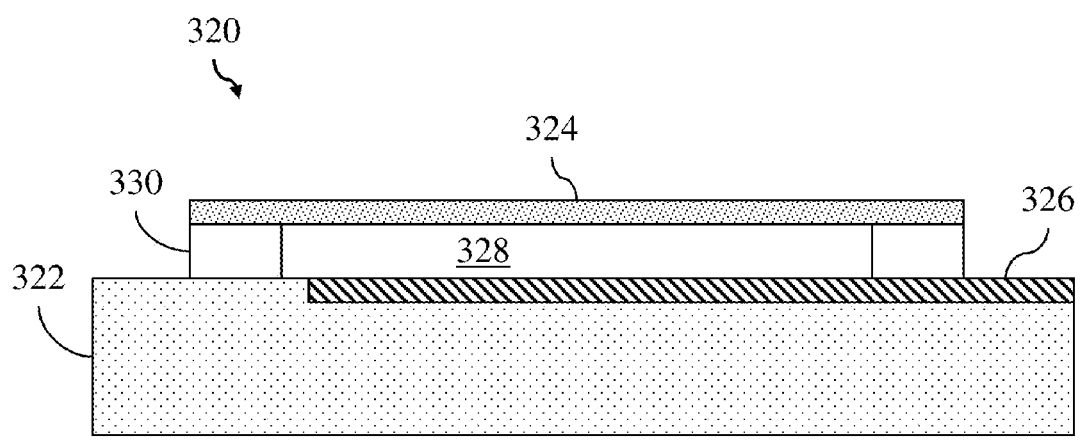
FIG. 10 illustrates a cross-section of a further MEMS pressure transducer.

FIG. 10 illustrates a cross-section of a further MEMS pressure transducer 320 that includes substrate 322, electrode 326, membrane 324, and cavity 328. Membrane 324 is separated from electrode 326 by insulators 330. As similarly described hereinabove in reference to MEMS pressure transducer 300, a pressure change in the ambient environment causes membrane 324 of MEMS pressure transducer 320 to deflect and produces a transduced signal at contacts coupled to electrode 326 and membrane 324. As discussed hereinabove in reference to the other figures, the mechanical properties of membrane 324 affect the frequency response of MEMS pressure transducer 320 by adjusting the high and low cutoff frequencies $f_H$ and $f_L$.

Figure 11:
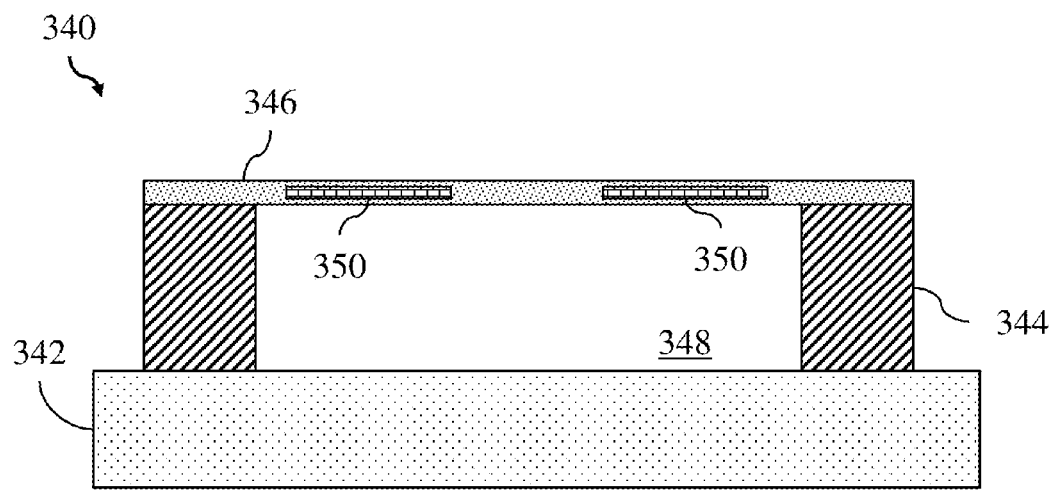
FIG. 11 illustrates a cross-section of another MEMS pressure transducer.

FIG. 11 illustrates a cross-section of another MEMS pressure transducer 340. According to various embodiments, MEMS pressure transducer 340 is a piezoresistive or piezoelectric pressure sensor that includes substrate 342, sidewalls 344, membrane 346, and cavity 348. Disposed on, or included in, membrane 346 are piezo-sensors 350. Piezo-sensors 350 may be implemented as a piezoelectric material or a piezoresistive material.

In various embodiments, pressure changes in the ambient environment cause deflections of membrane 346. For a piezoresistive material, the deflections change the resistance of piezo-sensors 350 and the resistance is measured by readout electrodes (not shown). For a piezoelectric material, the deflections cause piezo-sensors 350 to generate a voltage that is supplied to readout electronics (not shown). As discussed hereinabove in reference to the other figures, the mechanical properties of membrane 346 affect the frequency response of MEMS pressure transducer 340 by adjusting the high and low cutoff frequencies $f_H$ and $f_L$.

Figure 12:
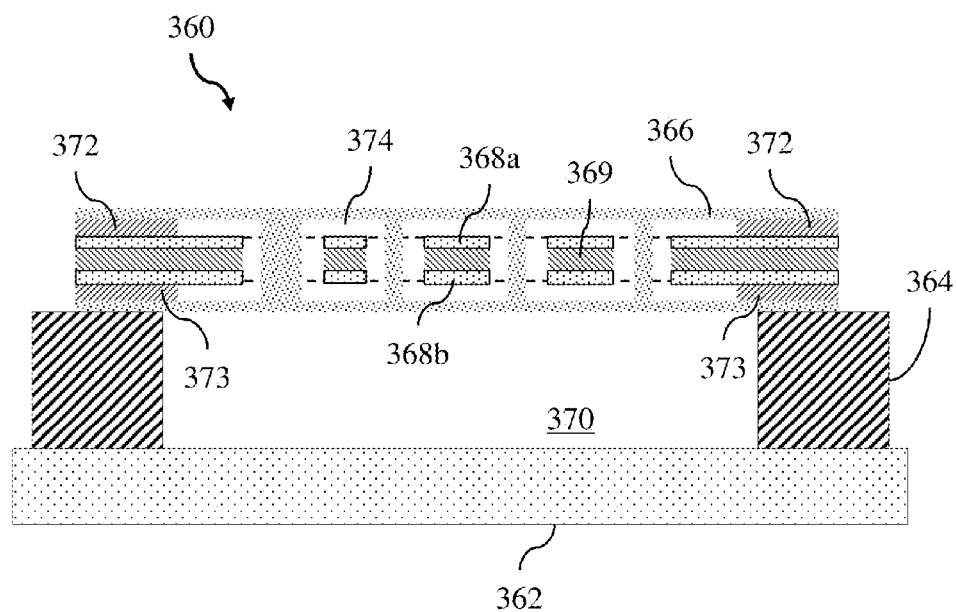
FIG. 12 illustrates a cross-section of a still further MEMS pressure transducer.

FIG. 12 illustrates a cross-section of a still further MEMS pressure transducer 360 that includes substrate 362, sidewalls 364, cavity 370, deflectable membrane 366, and a rigid backplate with upper and lower electrodes 368a and 368b. Structural layers 369, 372, and 373 separate upper and lower electrodes 368a and 368b from each other and from membrane 366. In some embodiments, structural layers 369, 372, and 373 are formed of an oxide, for example. A similar structure as MEMS pressure transducer 360, and the manufacture thereof, is described in the co-pending application Ser. No. 13/931,584 entitled "MEMS Microphone with Low Pressure Region between Diaphragm and Counter Electrode" filed Jun. 28, 2013, which is incorporated herein by reference in its entirety and also in the co-pending application Ser. No. 14/198,634 entitled "MEMS Sensor Structure for Sensing Pressure Waves and a Change in Ambient Pressure" filed Mar. 6, 2014, which is incorporated herein by reference in its entirety. These co-pending applications describe a MEMS microphone structure and a static MEMS pressure sensor. As discussed hereinabove in reference to the other figures, the mechanical properties of membrane 366 affect the frequency response of MEMS pressure transducer 360 by adjusting the high and low cutoff frequencies $f_H$ and $f_L$.

According to various embodiments, a readout circuit (not shown) measures the backplate voltages on electrodes 368a and 368b. When membrane 366 moves, the readout circuit produces two signals, one signal proportional and one signal inversely proportional to the membrane movement. In such embodiments, the difference of the two signals, which is generated in the readout circuit, is proportional to membrane movement and, thus, the applied air pressure, which may be due to acoustic signals or pressure changes in the air.

In further embodiments, pressure measurement signals may be generated by the same structure according to a second mechanism. According to various embodiments, cavity 374 is a sealed volume formed by membrane 366. Absolute pressure changes may affect the distance between the upper and lower part of membrane 366. In some embodiments, such an effect may change the sensitivity of the microphone system; however, it may be beneficial in some embodiments. The change in distance between the upper and lower part of membrane 366 may be measured by evaluating the sum of the backplate voltages on electrodes 368a and 368b, which may be generated in the readout circuit (not shown). In such embodiments, the generated sum signal is proportional to atmospheric pressure.

Figure 13A:
FIGS. 13a-13r illustrate cross-sections of a fabrication process flow for an additional MEMS pressure transducer.
Figure 13B:
Figure 13C:
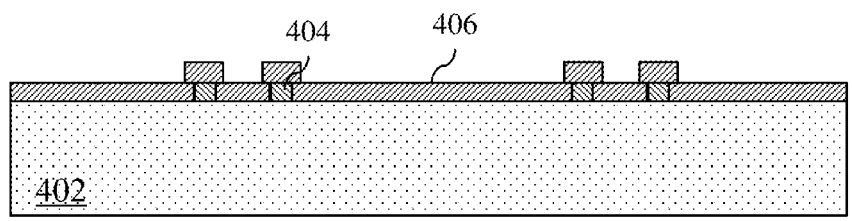
Figure 13D:
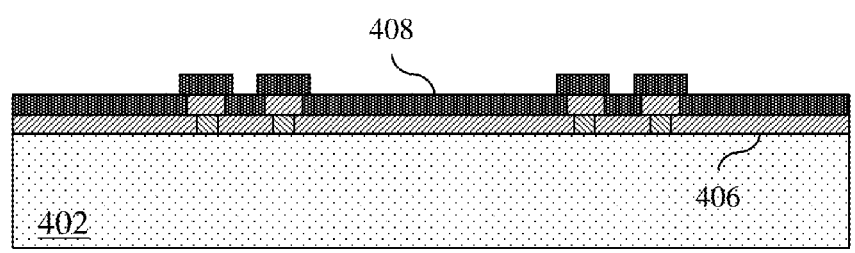
Figure 13E:
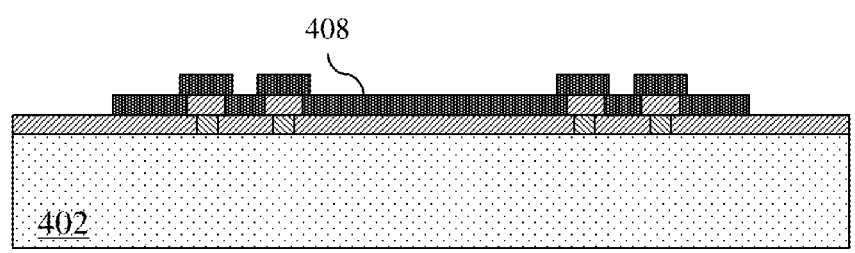
Figure 13F:
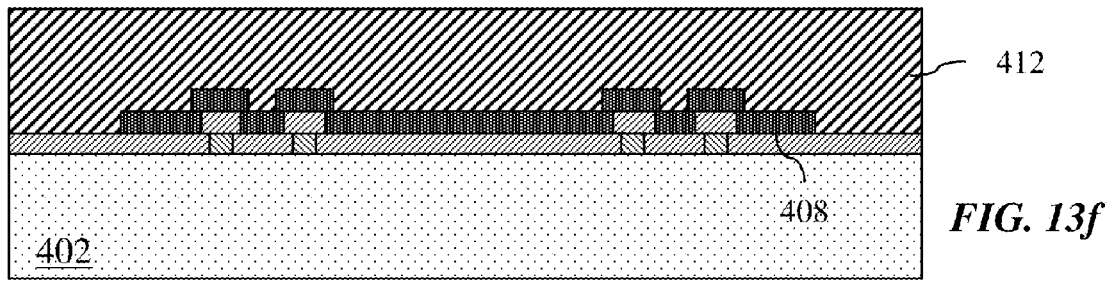
Figure 13G:
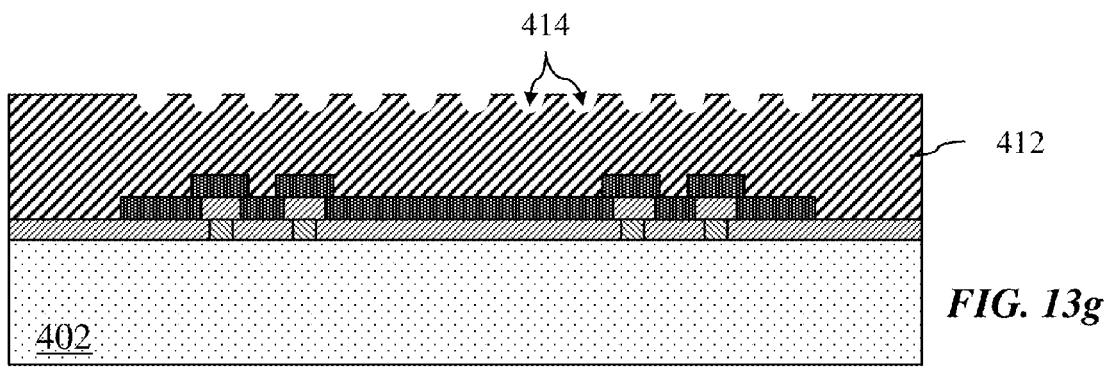
Figure 13H:
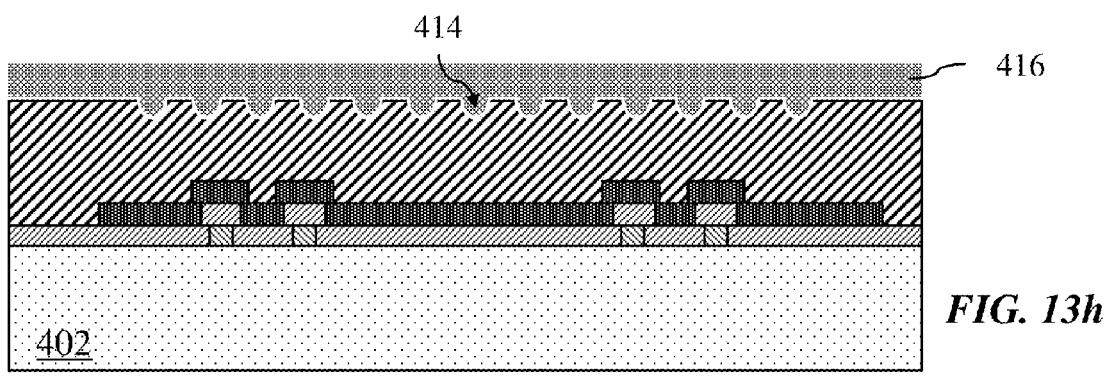
Figure 13I:
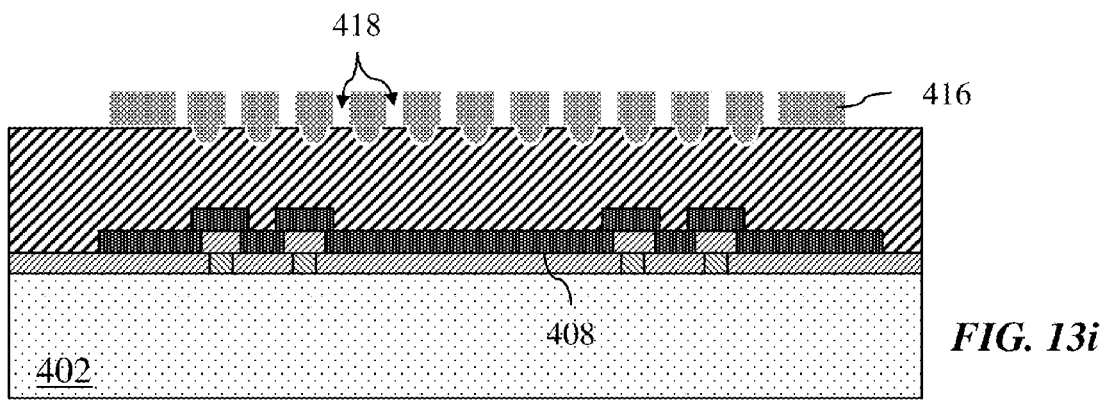
Figure 13J:
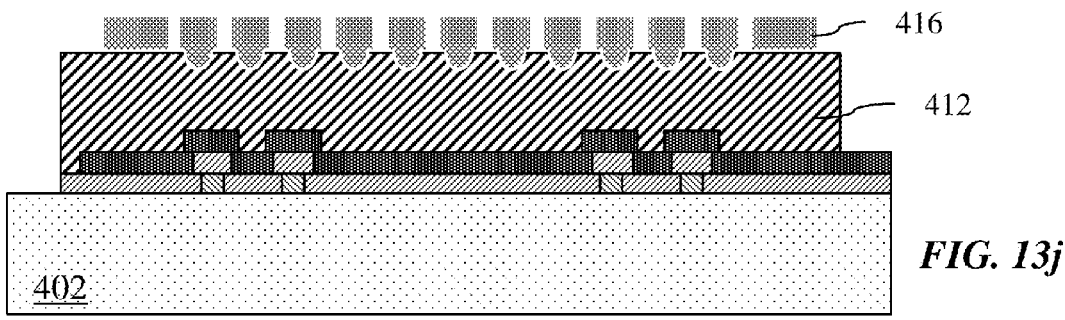
Figure 13K:
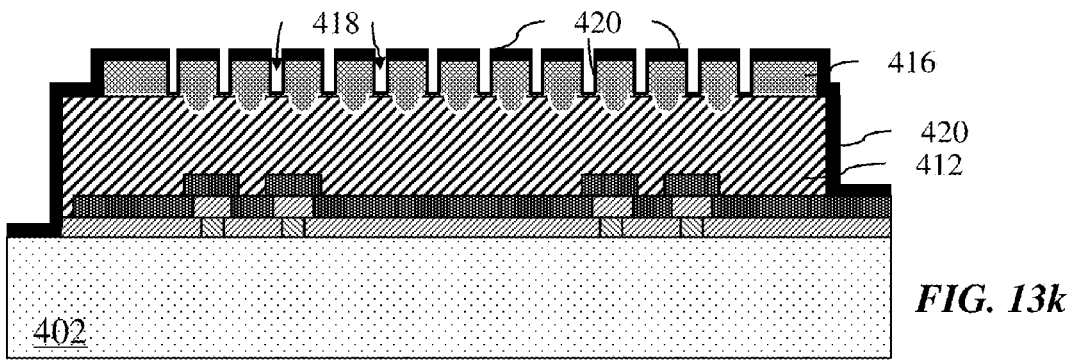
Figure 13L:
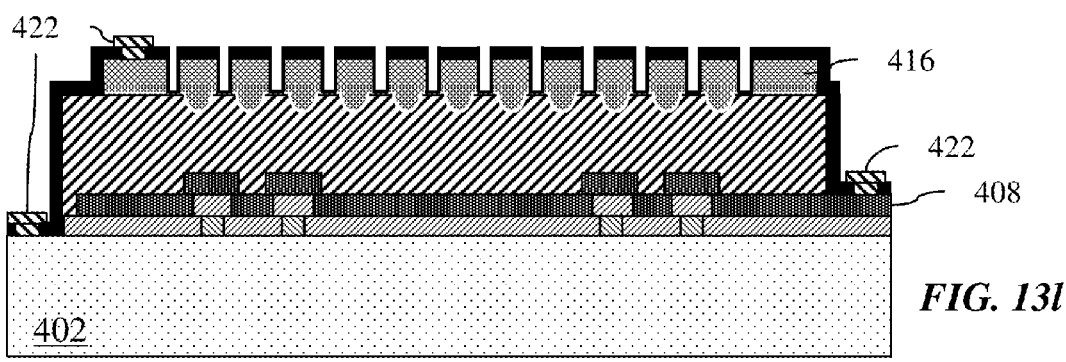
Figure 13M:
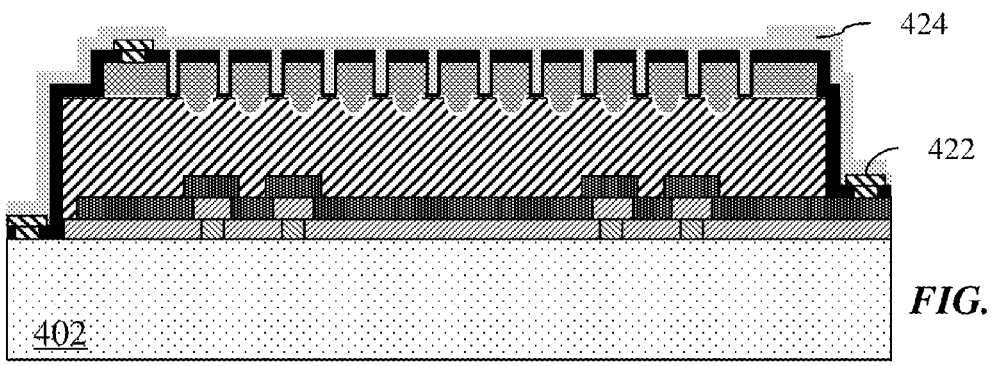
Figure 13N:
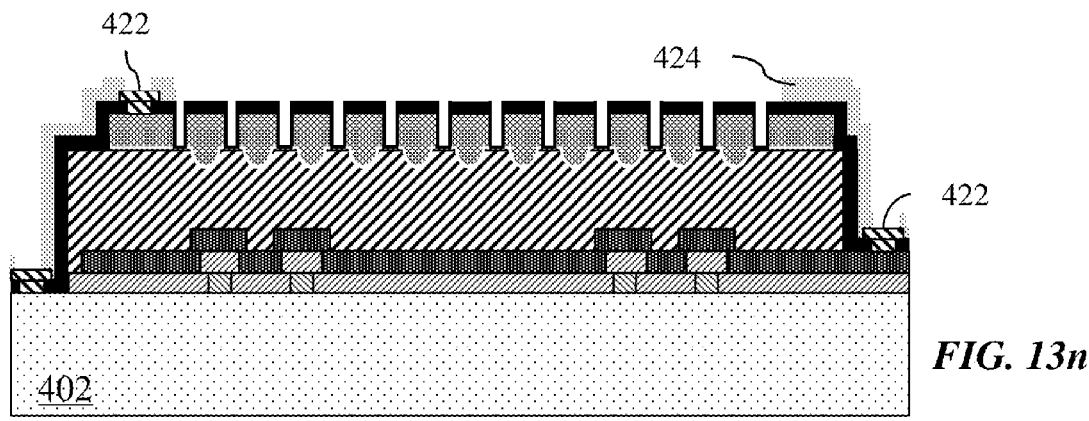
Figure 13O:
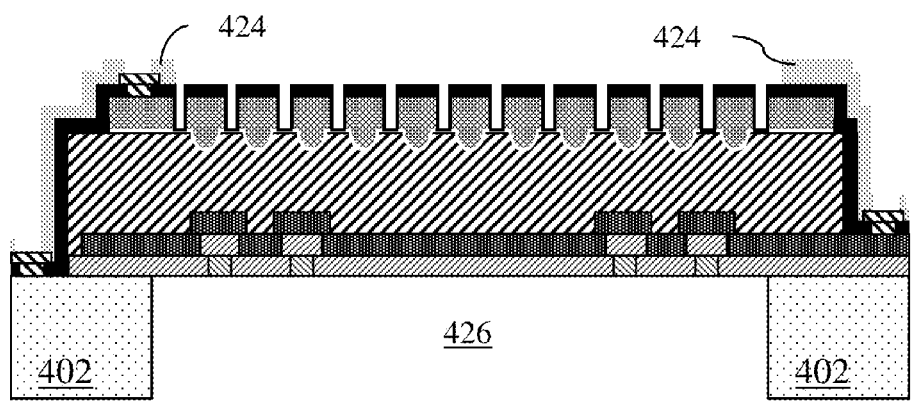
Figure 13P:
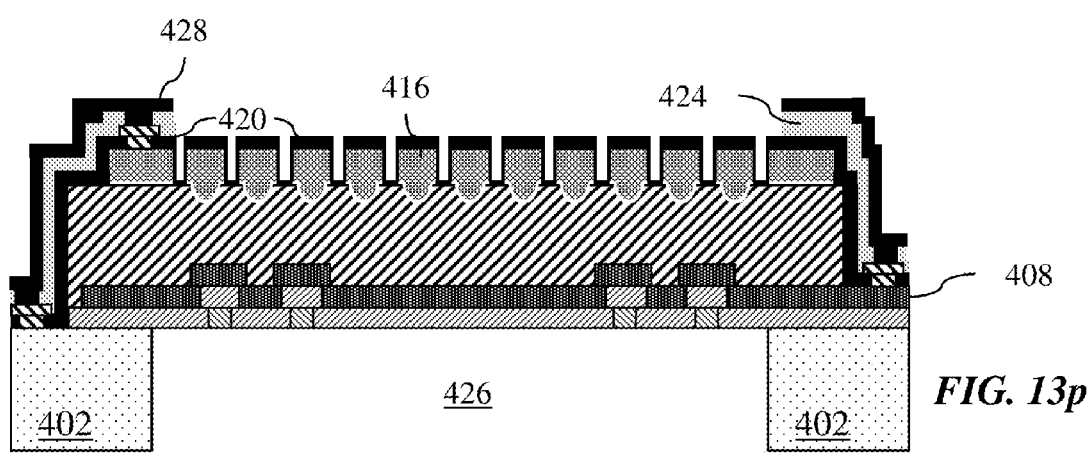
Figure 13Q:
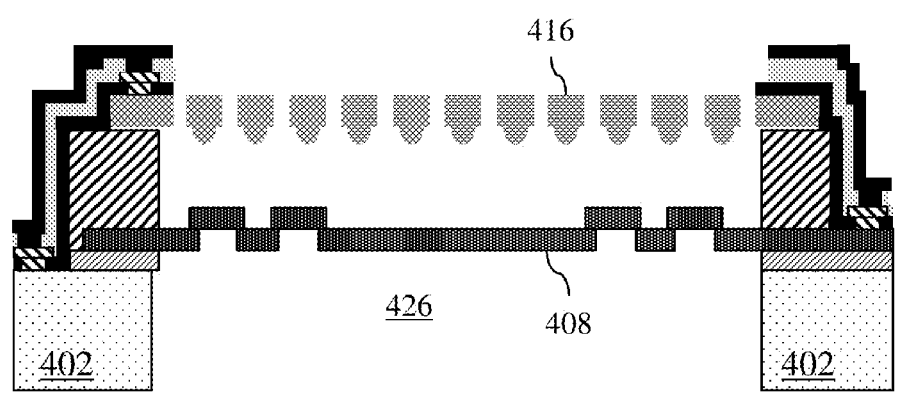
Figure 13R:
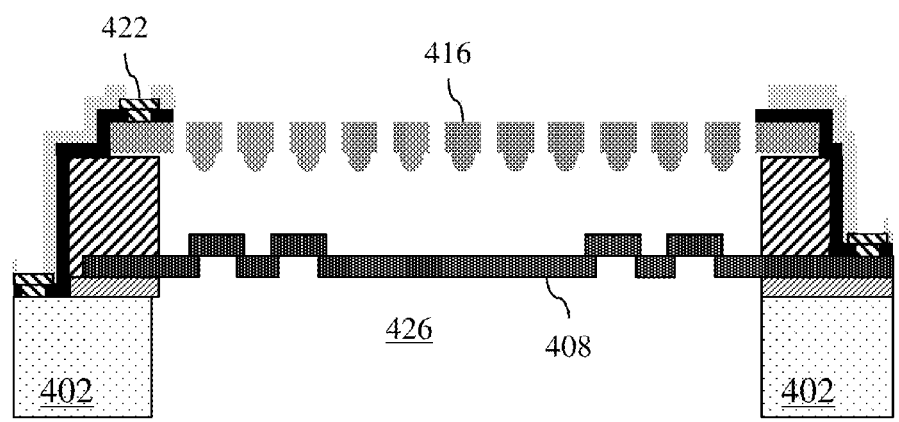

FIGS. 13a-13r illustrate cross-sections of a fabrication process flow for an additional MEMS pressure transducer. According to various embodiments, a similar process flow may be implemented for the various other MEMS pressure transducer described herein. According to various embodiments, FIG. 13a begins with silicon substrate 402. In alternative embodiments, substrate 402 may be a material other than silicon. FIG. 13b shows oxide bumps 404 that have been deposited or grown on substrate 402 and patterned. Oxides discussed in reference to FIGS. 13a-13r may include semiconductor oxides, such as silicon dioxide for example.

Another layer of oxide is deposited or grown forming membrane support 406 as shown in FIG. 13c. As shown, oxide bumps cause bumps or corrugation in membrane support 406. In FIG. 13d, a layer of polysilicon is deposited forming membrane 408. Membrane 408 includes corrugation due to oxide bumps 404. Membrane 408 may include doped or undoped polysilicon. For example, membrane 408 may be doped with phosphorous. In a next step, membrane 408 is patterned as shown in FIG. 13e. As described previously, the thickness of membrane 408, affecting the mass and stiffness, also affects the frequency response including the high and low frequency cutoff $f_H$ and $f_L$ and the sensitivity of the MEMS pressure transducer.

After membrane 408 is patterned, a thick oxide is deposited to form backplate support 412 as shown in FIG. 13f. FIG. 13g depicts the next step, during which backplate support 412 is patterned to form holes 414. Then, as shown in FIG. 13h, backplate 416 is deposited. Backplate 416 may be formed of doped or undoped polysilicon, metal, or various other conductive materials. As shown in FIG. 13h, holes 414 cause dimples to form in backplate 416.

In FIG. 13i, backplate 416 is patterned with perforations 418. Perforations 418 are placed throughout the structure of backplate 416 in order to allow airflow through backplate 416 that may displace membrane 408 during operation of the completed device. Backplate support 412 is patterned as shown in FIG. 13j. The size (diameter) and number of perforations 418 in backplate 416 affect the high frequency cutoff $f_H$ in the characteristic frequency response. After patterning backplate support 412, passivation layer 420 is deposited as shown in FIG. 13k. Passivation layer 420 covers the formed structures and also goes between perforations 418 in backplate 416. As shown in FIG. 13l, metallization contacts 422 are deposited and patterned for electrical contact with substrate 402, backplate 416, and membrane 408.

Another passivation layer 424 is deposited as shown in FIG. 13m and patterned in order to expose contacts 422 as shown in FIG. 13n. A backside etch is performed in substrate 402 in order to form cavity 426 as shown in FIG. 13o. According to various embodiments, a BOSCH etch process is performed to implement the backside etch and form cavity 426. On top of passivation layers 420 and 424, temporary protection layer 428 is deposited as shown in FIG. 13p in order to protect backplate 416 and membrane 408 during the release step. The release step is performed releasing backplate 416 and membrane 408 as shown in FIG. 13q. Finally, temporary protection layer 428 is removed exposing contact 422 as shown in FIG. 13r.

Various modifications to the embodiment fabrication sequence described in FIGS. 13a-13r are envisioned. Further, the structure may be modified in numerous embodiments and modifications to the fabrication sequence will be expected. The various steps described herein and the accompanying figures are illustrative. According to various embodiments, structures may include sloped sidewalls, rough surfaces, and numerous dimensions.

Figure 14:
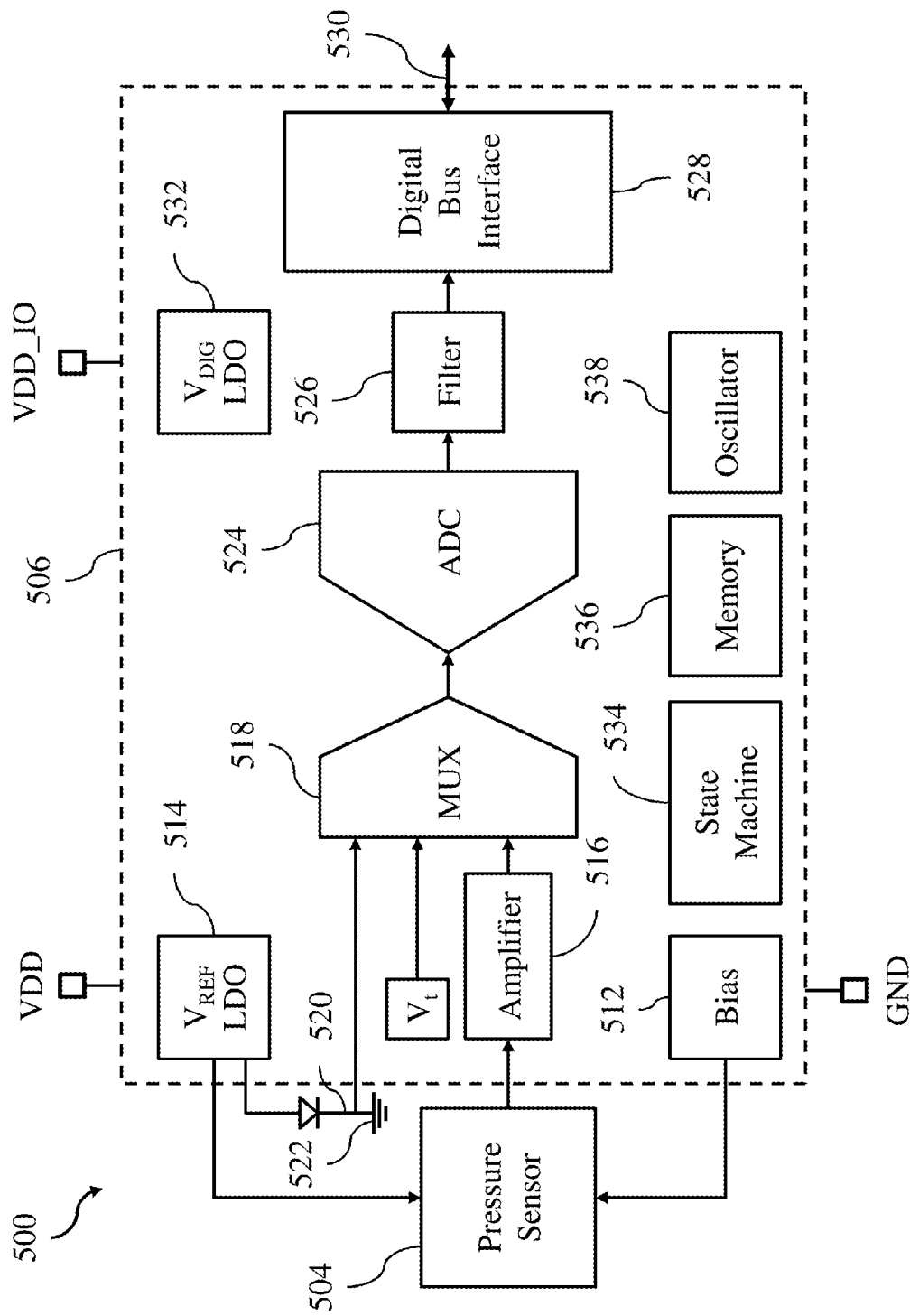
FIG. 14 illustrates a detailed block diagram of an interface circuit for a pressure sensor.

FIG. 14 illustrates a detailed block diagram of an interface circuit 500 for a pressure sensor including pressure sensor 504 and IC 506. According to various embodiments, interface circuit 500 may be an implementation of IC 106 described in reference to FIG. 1 or ASIC 154 described in reference to FIGS. 5a, 5b, and 6. Further, pressure sensor 504 may be implemented according to any of the MEMS pressure transducers described herein in reference to the other figures.

According to various embodiments, pressure sensor 504 is biased with bias block 512 and reference voltage $V_{REF}$ from reference block 514, which may be a low-dropout regulator (LDO) referred to as LDO 514. Pressure sensor 504 supplies a sensed and transduced pressure change to amplifier 516, and multiplexer 518 selects the amplified pressure signal, a temperature (of the IC or sensor) proportional voltage $V_t$, or a reference voltage from node 520 that is coupled to reference terminal 522 and LDO 514. The output of multiplexer 518 is converted to a digital signal by analog to digital converter (ADC) 524, filtered by filter 526, and interfaced with digital bus 530 by digital bus interface 528. IC 506 may also include a digital voltage reference supplied by LDO 532, state machine 534 for digital logic operations, memory 536 for digital operations or filtering, and oscillator 538 to clock any digital blocks. IC 506 is supplied with reference terminals VDD and GND as well as input/output (I/O) voltage supply VDD_IO for coupling to digital bus 530.

In some embodiments, filter 526 may implement the processing or filtering as described in reference to filter 224 and signal processor 226 in FIG. 8. For example, filter 526 may include an inverse high pass filter or low pass or high pass digital filters. In other embodiments, filter 526 is an analog filter and is rearranged to be coupled between multiplexer 518 and ADC 524.

Other embodiments may include different functional components and/or additional functional components in order to implement specific features of a sensor and/or interface IC. For example, in some embodiments, IC 506 may include digital correction algorithms used for linearizing sensed pressure signals. In some embodiments, temperature correction may be implemented using the temperature proportional voltage $V_t$. In various embodiments, IC 506 also provides temperature information and/or factory calibration data as a read out to digital bus 530.

According to an embodiment, a method of measuring wind speed includes measuring atmospheric pressure at a first pressure sensor arranged inside a case and shielded from wind, measuring air pressure at a second pressure sensor arranged at an opening in the case, and determining wind speed at the opening in the case based on measuring the atmospheric pressure and the air pressure.

In various embodiments, determining the wind speed includes generating a first signal based on measuring the atmospheric pressure, generating a second signal based on measuring the air pressure, generating a difference signal by subtracting the first signal from the second signal, and calculating wind speed using the difference signal. In some embodiments, calculating the wind speed includes calculating the wind speed S using an equation $S=\sqrt{2\cdot(P2-P1)\div\rho}$, where the first signal is P1, the second signal is P2, and density of air is ρ.

In various embodiments, measuring air pressure at a second pressure sensor includes measuring a plurality of air pressures at a plurality of pressure sensors arranged at a plurality of openings in the case. In such embodiments, the method further includes determining wind direction based on measuring the plurality of air pressures. Each opening of the plurality of openings may be arranged facing in a direction that is separated from a direction of another opening of the plurality of openings by about 90°.

In various embodiments, the first pressure sensor and the second pressure sensor each includes a cubic volume of less than about 50 mm$^3$. In some embodiments, measuring air pressure at a second pressure sensor includes measuring air pressure at a second pressure sensor arranged at the opening in the case, where the opening has a diameter of less than 0.3 mm. Implementations of the described techniques may include electronic systems or hardware, corresponding methods, or computer software on a computer-accessible medium.

According to an embodiment, an electronic device includes a case including a port, a first MEMS pressure sensor arranged inside the case adjacent the port, a second MEMS pressure sensor arranged inside the case and shielded from the port, and an application processing circuit arranged inside the case and electrically coupled to the first MEMS pressure sensor and the second MEMS pressure sensor. The application processing circuit is configured to determine wind speed at the port based on signals received from the first MEMS pressure sensor and the second MEMS pressure sensor.

In various embodiments, the first MEMS pressure sensor and the MEMS second pressure sensor each includes a cubic volume of less than about 50 mm$^3$. The electronic device may further include a third MEMS pressure sensor arranged inside the case adjacent an additional port. In some embodiments, the electronic device further includes a plurality of additional MEMS pressure sensors arranged inside the case adjacent a plurality of additional ports. In such embodiments, the application processing circuit is further configured to determine wind direction based on signals received from the first MEMS pressure sensor, the second MEMS pressure sensor, and the plurality of additional MEMS pressure sensors. Each additional port of the plurality of additional ports may be arranged facing in a direction that is separated from a direction of another port of the plurality of additional ports by about 90°.

In various embodiments, the port has a diameter of less than 0.3 mm. In some embodiments, the electronic device further includes a wind shield arranged inside the case between the port and the second MEMS pressure sensor. The first MEMS pressure sensor and the second MEMS pressure sensor may each include a capacitive pressure sensor. In an embodiment, the first MEMS pressure sensor and the second MEMS pressure sensor each includes a dual backplate MEMS microphone. In another embodiment, the first MEMS pressure sensor and the second MEMS pressure sensor each includes a piezoresistive or a piezoelectric pressure sensor. Implementations of the described techniques may include electronic systems or hardware, corresponding methods, or computer software on a computer-accessible medium.

According to an embodiment, an electronic device includes a case including a port, a circuit board arranged inside the case, a display arranged inside the case and attached to the circuit board, a first sensor package attached to the circuit board and in direct fluid communication with the port, a second sensor package attached to the circuit board and in indirect fluid communication with the port, and an application processor attached to the circuit board and electrically coupled to the first sensor package and the second sensor package. The first sensor package includes a first pressure sensor and the second sensor package includes a second pressure sensor.

In various embodiments, the electronic device further includes a wind shield between the port and the second sensor package. In some embodiments, the electronic device further includes a wireless communication circuit. The first sensor package may further include an acoustic transducer. Implementations of the described techniques may include electronic systems or hardware, corresponding methods, or computer software on a computer-accessible medium.

According to an embodiment, a method of measuring wind speed of wind includes measuring a first air pressure at a first pressure sensor arranged at a first opening in a case, measuring a second air pressure at a second pressure sensor arranged at a second opening, and determining wind speed at the first opening in the case based on measuring the first air pressure and the second air pressure.

In various embodiments, determining the wind speed includes generating a first signal based on measuring the first air pressure, generating a second signal based on measuring second air pressure, generating a difference signal by subtracting the first signal from the second signal, and calculating wind speed using the difference signal. In some embodiments, measuring a second air pressure at a second pressure sensor includes measuring a plurality of air pressures at a plurality of pressure sensors arranged at a plurality of openings in the case. In such embodiments, the method further includes determining wind direction based on measuring the plurality of air pressures. Each opening of the plurality of openings may be arranged facing in a direction that is separated from a direction of another opening of the plurality of openings by about 90°. In an embodiment, the first opening faces the wind and the second opening faces away from the wind. Implementations of the described techniques may include electronic systems or hardware, corresponding methods, or computer software on a computer-accessible medium.

According to various embodiments described herein, advantages may include a compact or integrated wind speed meter. Some advantages may include cheaper wind speed measurements or improved accuracy of wind speed measurements. Some advantages may include wind speed meters that may be easily included in various electronic devices, such as compact or mobile electronic devices.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of measuring wind speed comprising:
    measuring atmospheric pressure at a first pressure sensor arranged inside a case and shielded from wind;
    measuring air pressure at a second pressure sensor arranged at an opening in the case; and
    determining wind speed at the opening in the case based on measuring the atmospheric pressure and the air pressure, wherein determining the wind speed at the opening in the case comprises using an application processing circuit arranged inside the case and electrically coupled to the first pressure sensor and the second pressure sensor, wherein the application processing circuit is configured to determine the wind speed based on a first signal received from the first pressure sensor and a second signal received from the second pressure sensor.

2. The method of claim 1, wherein determining the wind speed comprises:
   generating the first signal based on measuring the atmospheric pressure;
   generating the second signal based on measuring the air pressure;
   generating a difference signal by subtracting the first signal from the second signal; and
   calculating the wind speed using the difference signal.

3. The method of claim 2, wherein calculating the wind speed comprises calculating wind speed S using an equation $S=\sqrt{2 \cdot (P2-P1) \div \rho}$, wherein the first signal is P1, the second signal is P2, and density of air is $\rho$.

4. The method of claim 1, wherein measuring air pressure at the second pressure sensor comprises measuring a plurality of air pressures at a plurality of pressure sensors arranged at a plurality of openings in the case.

5. The method of claim 4, further comprising determining wind direction based on measuring the plurality of air pressures.

6. The method of claim 4, wherein each opening of the plurality of openings is arranged facing in a direction that is separated from a direction of another opening of the plurality of openings by about 90°.

7. The method of claim 1, wherein the first pressure sensor and the second pressure sensor each comprises a cubic volume of less than about 50 mm$^3$.

8. The method of claim 1, wherein measuring air pressure at a second pressure sensor comprises measuring air pressure at a second pressure sensor arranged at the opening in the case, wherein the opening has a diameter of less than 0.3 mm.

9. An electronic device comprising:
   a case comprising a port;
   a first MEMS pressure sensor arranged inside the case adjacent the port;
   a second MEMS pressure sensor arranged inside the case and shielded from the port; and
   an application processing circuit arranged inside the case and electrically coupled to the first MEMS pressure sensor and the second MEMS pressure sensor, wherein the application processing circuit is configured to determine wind speed at the port based on signals received from the first MEMS pressure sensor and the second MEMS pressure sensor.

10. The electronic device of claim 9, wherein the first MEMS pressure sensor and the MEMS second pressure sensor each comprises a cubic volume of less than about 50 mm$^3$.

11. The electronic device of claim 9, further comprising a third MEMS pressure sensor arranged inside the case adjacent an additional port.

12. The electronic device of claim 9, further comprising a plurality of additional MEMS pressure sensors arranged inside the case adjacent a plurality of additional ports, wherein the application processing circuit is further configured to determine wind direction based on signals received from the first MEMS pressure sensor, the second MEMS pressure sensor, and the plurality of additional MEMS pressure sensors.

13. The electronic device of claim 12, wherein each additional port of the plurality of additional ports is arranged facing in a direction that is separated from a direction of another port of the plurality of additional ports by about 90°.

14. The electronic device of claim 9, wherein the port has a diameter of less than 0.3 mm.

15. The electronic device of claim 9, further comprising a wind shield arranged inside the case between the port and the second MEMS pressure sensor.

16. The electronic device of claim 9, wherein the first MEMS pressure sensor and the second MEMS pressure sensor each comprises a capacitive pressure sensor.

17. The electronic device of claim 16, wherein the first MEMS pressure sensor and the second MEMS pressure sensor each comprises a dual backplate MEMS microphone.

18. The electronic device of claim 9, wherein the first MEMS pressure sensor and the second MEMS pressure sensor each comprises a piezoresistive or a piezoelectric pressure sensor.

19. An electronic device comprising:
   a case comprising a port;
   a circuit board arranged inside the case;
   a display arranged inside the case and attached to the circuit board;
   a first sensor package attached to the circuit board and in direct fluid communication with the port, wherein the first sensor package comprises a first pressure sensor;
   a second sensor package attached to the circuit board and in indirect fluid communication with the port, wherein the second sensor package comprises a second pressure sensor; and
   an application processor attached to the circuit board and electrically coupled to the first sensor package and the second sensor package.

20. The electronic device of claim 19, further comprising a wind shield between the port and the second sensor package.

21. The electronic device of claim 19, further comprising a wireless communication circuit.

22. The electronic device of claim 19, wherein the first sensor package further comprises an acoustic transducer.

23. A method of measuring wind speed of wind comprising:
   measuring a first air pressure at a first pressure sensor arranged at a first opening in a case;
   measuring a second air pressure at a second pressure sensor arranged at a second opening in the case, wherein measuring the second air pressure at the second pressure sensor comprises measuring a plurality of air pressures at a plurality of pressure sensors arranged at a plurality of openings in the case; and
   determining wind speed at the first opening in the case based on measuring the first air pressure and the second air pressure.

24. The method of claim 23, wherein determining the wind speed comprises:
   generating a first signal based on measuring the first air pressure;
   generating a second signal based on measuring second air pressure;
   generating a difference signal by subtracting the first signal from the second signal; and
   calculating wind speed using the difference signal.

25. The method of claim 23, further comprising determining wind direction based on measuring the plurality of air pressures.

26. The method of claim 23 wherein each opening of the plurality of openings is arranged facing in a direction that is separated from a direction of another opening of the plurality of openings by about 90°.

27. The method of claim 23, wherein the first opening faces the wind and the second opening faces away from the wind.

* * * * *